United States Patent [19]
Kalkunte et al.

[11] Patent Number: 5,995,488
[45] Date of Patent: Nov. 30, 1999

[54] METHOD AND APPARATUS FOR REGULATING DATA FLOW IN NETWORKS

[75] Inventors: Mohan Kalkunte; Shashank C. Merchant, both of Sunnyvale; Jayant Kadambi, Milpitas, all of Calif.

[73] Assignee: Advanced Micro Devices, Inc., Sunnyvale, Calif.

[21] Appl. No.: 08/766,565

[22] Filed: Dec. 13, 1996

Related U.S. Application Data

[60] Provisional application No. 60/028,036, Oct. 8, 1996.

[51] Int. Cl.⁶ .................................................. G01F 11/00
[52] U.S. Cl. ......................................... 370/232; 370/445
[58] Field of Search ................................... 370/252, 253, 370/232, 235, 445, 236, 315, 320, 441, 229; 340/825.14

[56] References Cited

U.S. PATENT DOCUMENTS

| | | | |
|---|---|---|---|
| 4,516,239 | 5/1985 | Maxemchuk | 370/445 |
| 5,189,411 | 2/1993 | Collar et al. | 340/825.14 |
| 5,319,641 | 6/1994 | Fridrich et al. | |
| 5,353,287 | 10/1994 | Kuddes et al. | |
| 5,404,353 | 4/1995 | Ben-Michael et al. | |
| 5,418,784 | 5/1995 | Ramakrishnan et al. | 370/445 |
| 5,422,887 | 6/1995 | Diepstraten et al. | |
| 5,436,903 | 7/1995 | Yang et al. | |
| 5,526,355 | 6/1996 | Yang et al. | |
| 5,757,772 | 5/1998 | Thornberg et al. | 370/236 |

FOREIGN PATENT DOCUMENTS 0632621  4/1995  European Pat. Off. .

OTHER PUBLICATIONS

Comer, D.E., et al., "A Rate–Congested Avoidance and Control Scheme for Packet Switched Networks," Proceedings of the International Conference on Distributed Computin Systems, Paris, May 28–Jun. 1, 1990, Conf. 10, May 28, 1990, IEEE, pp. 390–397.

Williamson, C.L., et al., "Loss–Load Curves: Support for Rate–Based Congestion Control in High–Speed Datagram Networks," Proceedings of the Conference on Communications Architectures and Protocols (SIGCOMM), Zurich, Sep. 3–6, 1996, vol. 21, No. 4, Sep. 3, 1991, Association for Computing Machinery, pp. 17–28.

Pouzin, Louis, "Methods, Tools, and Observations on Flow Control in Packet–Switched Data Networks," IEEE Trans. on Communications, vol. 29, No. 4, Apr. 1981, New York, pp. 413–426.

Gerla, M. et al., "Congestion Control in Interconnected LANS," IEEE Network, vol. 2, No. 1, Jan. 2, 1988, New York, pp. 72–76.

AMD, AM79C971 Pcnet™FAST Single–Chip Full–Duplex 10/100 mbps Ethernet Controller for PCI Local Bus, Preliminary Data Sheet Publication #20550, Rev. B, May 1996.

Internet Message to: stds–802–3–hssg.ieee.org, from Alakd@aol.com, subject "IPG Issues", Aug. 27, 1996.

Internet Message to: Alakd@aol.com, stds–802–3–hssg@ieee.org from mart@CS.UCR.edu, subject "IPG Issues", Aug. 27, 1996.

Johnson, "Fast Ethernet: Dawn of a New Network", Prentice–Hall, Inc. (1996), pp. 158–175.

Breyer et al., "Switched and Fast Ethernet: How It Works and How to Use It", Ziff–Davis Press, Emeryville, California (1995), pp. 60–70.

*Primary Examiner*—Chi H. Pham
*Assistant Examiner*—Kim T. Nguyen

[57] ABSTRACT

Interpacket delay times are modified in full-duplex Ethernet network devices by calculating for each network station a delay interval based on a time to transmit a data packet at the network rate and a calculated time to transmit the data packet at a desired transmission rate. The network station waits the calculated delay time following a packet transmission before transmitting the next data packet, ensuring that the overall output transmission rate of the network station corresponds to the assigned desired transmission rate. The desired transmission rate is received as a media access control (MAC) control frame from a network management entity, such as a switched hub. Hence, each network station operates at the desired transmission rate, minimizing the occurrence of congestion and eliminating the necessity of PAUSE frames.

15 Claims, 10 Drawing Sheets

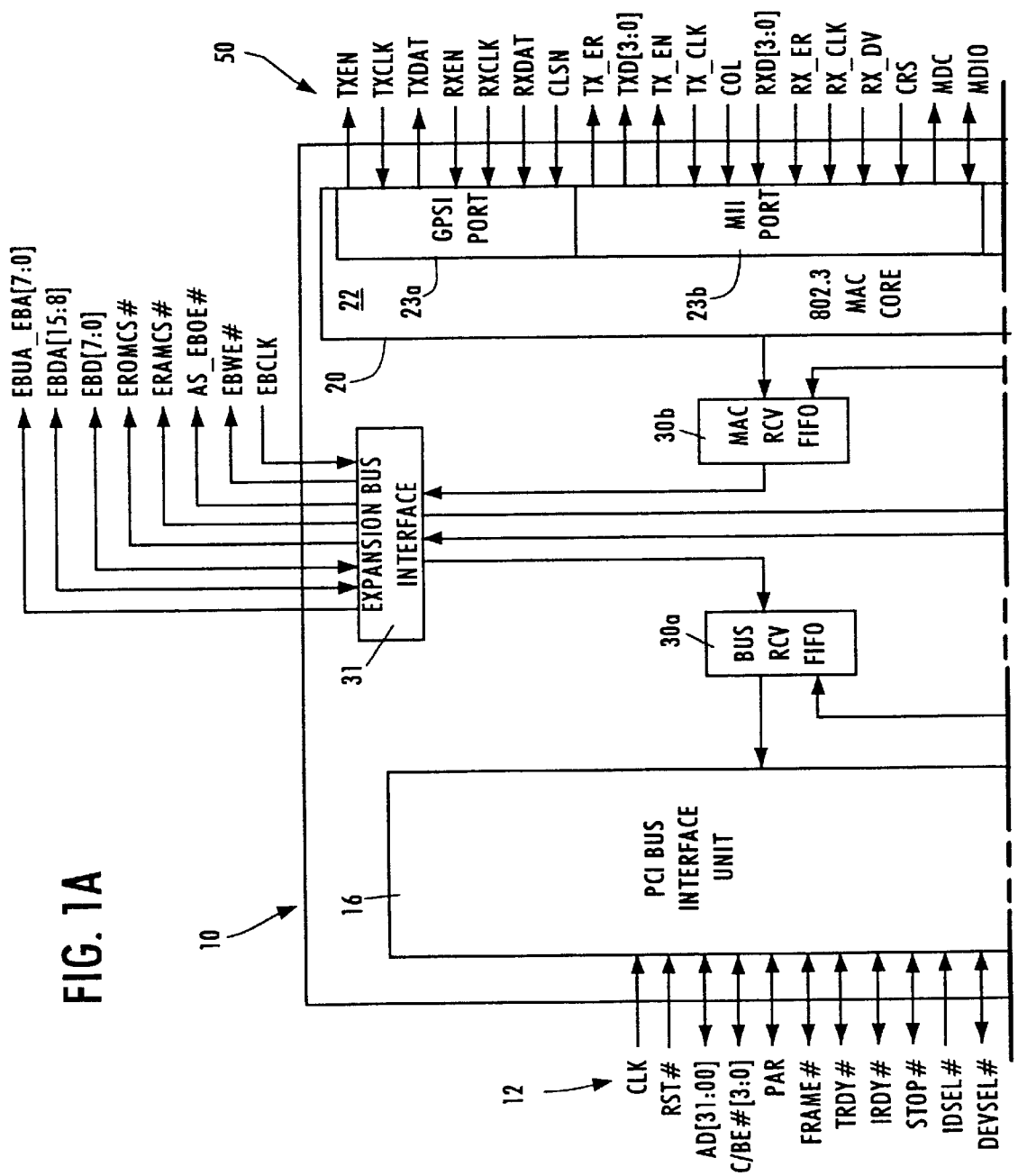

METHOD AND APPARATUS FOR REGULATING DATA FLOW IN NETWORKS

RELATED APPLICATIONS

This application claims priority from Provisional Patent Application Ser. No. 60/028,036, filed Oct. 8, 1996, which is incorporated herein by reference.

FIELD OF THE INVENTION

The present invention relates to networks and more particularly, to a method and apparatus for regulating data flow in networks. The invention has particular applicability to networks satisfying Ethernet protocol.

BACKGROUND OF THE INVENTION

Many communications networks such as local area networks (LANs) use a network cable or other media to link network stations together on the network. Typically, each network station is free to communicate with other network stations on the network subject to the particular communications protocol used. However, when large amounts of data are transferred over networks, data congestion and data collisions often prevent the smooth transfer of data.

One solution to reduce data congestion and data collisions requires each network station to wait until data traffic on the media has temporarily subsided, providing a transmission window during which the network station can transmit its own data without collision. For example, the Ethernet protocol ISO/IEC 8802-3 (ANSI/IEEE Std. 802.3, 1993 edition) defines a half-duplex media access mechanism that permits all network stations to access the network channel with equality. Traffic is not distinguished or prioritized over the medium. According to this approach, each network station includes an Ethernet interface card that uses carrier-sense multiple-access with collision detection (CSMA/CD) to listen for traffic on the media. The absence of network traffic is detected by sensing a deassertion of a receive carrier on the media. A network station having data to send attempts to access the channel by waiting a predetermined time after the deassertion of a receive carrier on the media, known as the interpacket gap (IPG) interval.

Another approach has been to use a switched hub to marshal data flow on the network and allow network stations on the network to simultaneously transmit and receive data packets between each other without collisions. A full duplex environment has been proposed for Ethernet networks, referred to as IEEE 802.3x, Full Duplex with Flow Control-Working Draft (0.3). The full duplex environment provides a two-way, point-to-point communication link between two network stations using a switched hub. Hence, two network stations can simultaneously transmit and receive Ethernet data packets between each other without collisions. However, network congestion occurs if a receiving network station or a switched hub is unable to receive data at the transmission rate of the transmitting network station. For example, traffic in a client-server environment is often dominated by client requests followed by a burst of frames from the server to the requesting client.

Although the full duplex environment enables the server to transmit packets while receiving requests from other clients, only a limited number of client requests can be output from the switched hub to the server. If the number of client requests exceeds the capacity of the hub switching port assigned to the server, some of the data packets will be lost. Alternatively, a client having limited buffer space may be unable to keep up with the transmission rate of the server, resulting in lost packets.

As an alternative to the CSMA/CD and switched hub approaches, various data flow control techniques have been implemented to regulate data flow on networks. One approach to reducing network congestion involves a sending network station temporarily suspending transmission of data packets. A proposed flow control arrangement for a full duplex environment, referred to as IEEE 802.3x[2], specifies generation of a flow control message, for example a PAUSE frame. A transmitting network station that receives the PAUSE frame enters a pause state in which no frames are sent on the network for a time interval specified in the PAUSE frame.

Another proposed flow control arrangement for a half duplex environment, referred to as "backpressure", causes a receiving network station to force a collision with the transmitting network station when the receive buffer of the receiving network station reaches a "receive buffer unavailable" state.

Although these approaches reduce data congestion and collisions, they also reduce the effective bandwidth of the network media. For example, if a full-duplex receiving network station repeatedly sends PAUSE frames specifying small pause intervals to a transmitting network station, the effective bandwidth of the media is reduced due to the transmission of a plurality of 64-byte PAUSE messages instead of data. If a switched hub has a transmit buffer for data to be sent to a network station, repeated transmission of PAUSE frames by the switched hub to that network station reduces the removal rate of the data from the transmit buffer. Hence, the transmit buffer containing the data for the network station may tend to overflow.

Network throughput may also be reduced if the specified pause interval is too long, resulting in the transmitting network station remaining idle after the receiving network station has eliminated the congestion.

Data loss may also occur if data packets are sent by the transmitting network station after generation of the PAUSE frame by the receiving network station. For example, the transmitting network station may send a number of data packets before receipt of the PAUSE frame due to propagation delays between the transmitting and receiving network stations. The network throughput is further reduced if upper layer protocol requires the last data to be resent.

SUMMARY OF THE INVENTION

In view of the limitations associated with existing approaches for regulating data flow in networks, there is a need for an arrangement that regulates the rate of data transmission by a network station to minimize the necessity of flow control.

There is also a need for an arrangement in a network station that transmits data packets according to a desired transmission rate without the necessity of external monitoring or control.

There is also a need for an arrangement that minimizes congestion throughout a network.

These and other needs are attained by the present invention, wherein each network station dynamically adjusts its delay time between transmissions based on the size of the transmitted data.

According to one aspect of the present invention, a method is provided for transmitting data packets on a network according to a predetermined rate. A first data packet is transmitted onto the network at a first rate. Then, a delay time is determined based upon an elapsed time to transmit the first data packet at a first rate and a calculated time to transmit the first data packet at the predetermined rate. Upon expiration of the determined delay time following the first data packet transmission, a second data packet is transmitted onto the network. Hence, data packet transmissions are regulated to maintain an overall output transmission rate in accordance with the predetermined transmission rate.

According to another aspect of the present invention, a network interface is provided for communicatively coupling a network station to a network. The network interface includes a memory for storing a first data packet to be transmitted on the network and a controller for transmitting the first data packet from the memory onto the network at a first rate. The controller is configured to determine a waiting time after the transmission of the first data packet before the controller transmits a second data packet. The waiting time is based upon an elapsed time to transmit the first data packet at a first rate and a calculated time to transmit the first data packet at a predetermined rate.

According to yet another aspect of the present invention, a network is provided for supporting the transmission of data packets at a first rate. The network includes one or more nodes and a network controller residing on one of the nodes which is configured to regulate the flow of data packets onto the network at a predetermined rate. The predetermined rate is based upon both an elapsed time to transmit data packets at the first rate and a calculated time to transmit data packets at the predetermined rate.

Still another aspect of the present invention provides a method of transmitting data packets on a network according to approximately a predetermined rate. The method includes transmitting a first data packet onto the network at a first rate and then determining whether a data threshold has been exceeded. If the data threshold has been exceeded, then a delay time is based upon an elapsed time to transmit the first data packet at the first rate and a calculated time to transmit the first data packet at the predetermined rate.

Otherwise, if the data threshold has not been exceeded, then the delay time is based upon a minimum delay. Upon expiration of the determined delay time, a second data packet is transmitted onto the network.

Additional advantages and novel features of the invention will be set forth in part in the description which follows. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 1, 1A, and 1B are a block diagram of a network interface according to an embodiment of the present invention;

DETAILED DESCRIPTION OF THE PREFERRED EMBODIMENT

Figure 1B:
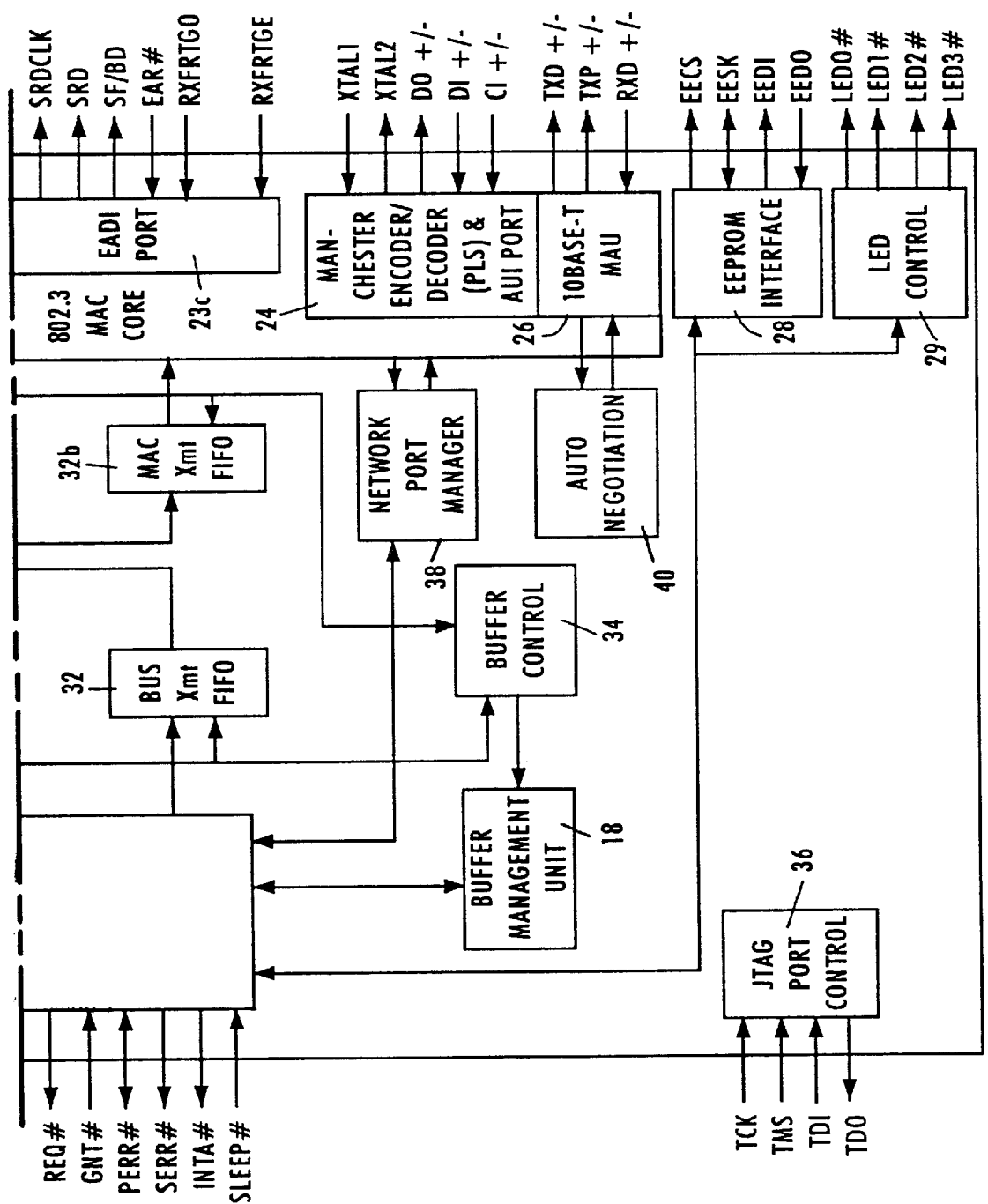

FIG. 1 is a block diagram of an exemplary network interface 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the Am79C971 PCnet™-FAST Single-Chip Full-Duplex Ethernet Controller for PCI Local Bus, disclosed in Preliminary Data Sheet Publication #20550, Rev. B, Issue Date May, 1996, from Advanced Micro Devices, Inc., Sunnyvale, Calif., the disclosure of which is incorporated in its entirety by reference.

The network interface 10 includes a PCI bus interface unit 16, a direct memory access (DMA) buffer management unit 18, and a network interface portion 20. The network interface portion 20 selectively operates in either halfduplex mode or full-duplex mode according to IEEE 802.3x[2]. The network interface portion 20 includes a media access control (MAC) core 22, a General Purpose Serial Interface (GPSI) 23a, a Media Independent Interface (MII) 23b for connecting external 10 MBit/s or 100 MBit/s transceivers, an External Address Detection Interface (EADI) 23c, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The network interface 10 also includes an EEPROM interface 28, an LED control 29, and an expansion bus interface 31 for boot RAM (e.g., EPROM or Flash memory) during startup, and an IEEE 1149.1-compliant JTAG Boundary Scan test access port interface 36. Full-duplex operation can be performed by any of the AUI, GPSI, 10BASE-T and MII interfaces. Additional details of these interfaces are disclosed in the above-referenced Am79C971 Preliminary Data Sheet.

The network interface 10 also includes a PCI bus receive first in first out (FIFO) buffer 30a, a MAC receive FIFO buffer 30b, a PCI bus transmit FIFO buffer 32a, a MAC transmit FIFO buffer 32b, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the PCI bus transmit FIFO buffer 32a, and subsequently to the MAC transmit FIFO buffer 32b.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The network interface 10 includes a network port manager 38 and an auto-negotiation unit 40. The auto-negotiation unit 40 communicates via the media 50 with a corresponding auto-negotiation unit in the hub serving the network interface 10, described below.

Figure 2:
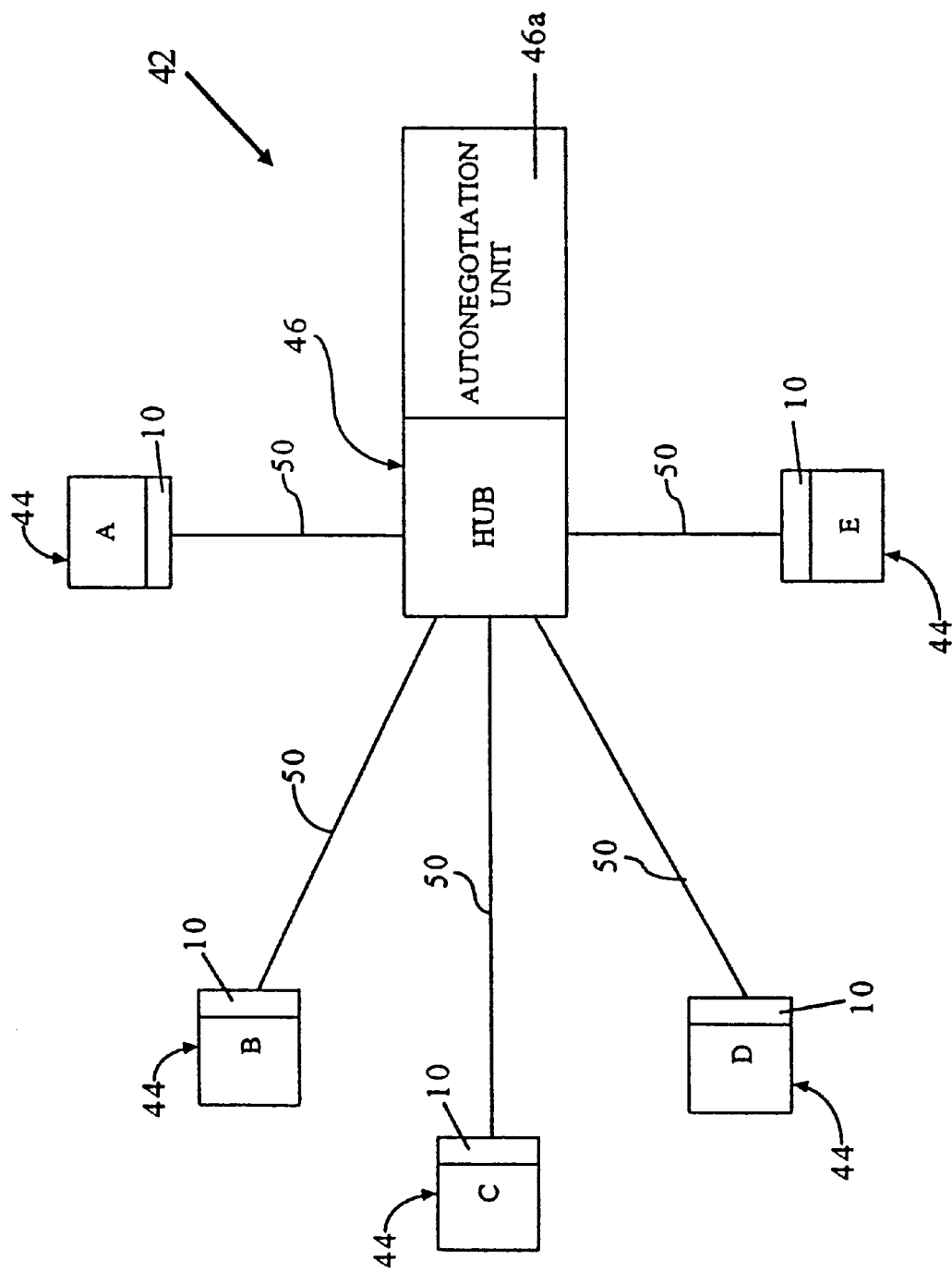
FIG. 2 is a block diagram of a network of stations each having the network interface of FIG. 1.

FIG. 2 illustrates a network 42 which includes five network stations 44 connected by a network media 50 to a hub 46. The network media 50 may be either coaxial, fiber optic, or twisted pair wire, or other similar network media and hence may couple the network interface 10 of each corresponding network station 44 to 10BASE-T, 10BASE-2, 100BASE-TX, 100BASE-T4, or 100BASE-FX networks. The network 42 may operate at 10 megabits per second (10 Mbit/s), 100 megabits per second (100 Mbit/s), or 1000 megabits per second (1000 Mbit/s).

The hub 46 is implemented as a full-duplex switch that simultaneously sends and receives data packets to each of the network stations 44. In addition, the hub 46, also referred to as a network manager, includes an auto-negotiation unit 46a that performs auto-negotiation functions with each of the network stations 44 with respect to physical layer protocol. For example, the auto-negotiation unit 46a includes a link start-up procedure each time a link to a network station 44 is connected, powered on or reset. During auto-negotiation, the hub 46 automatically configures each network station 44 for operating according to the network configuration parameters, for example, network topology, signaling, distance to hub, and number of stations on the network.

Upon completion of the auto-negotiation process by the hub 42, the network interface 10 in each network station 44 will receive and store network configuration data, described below. Additional details regarding repeaters and auto-negotiation are disclosed in Breyer et al. "Switched and Fast Ethernet: How It Works and How to Use It", Ziff-Davis Press, Emeryville, Calif. (1995), pp. 60–70, and Johnson, "Fast Ethernet: Dawn of a New Network", Prentice-Hall, Inc. (1996), pp. 158–175, the disclosures of which are incorporated in their entirety by reference.

The network 42 enables a network station 44 to simultaneously transmit and receive data packets on the network media 50. Hence, CSMA/CD functions are disabled in the network 42 such that controllers do not use carrier sense to defer to passing traffic, and do not use collision detect to abort, backoff, or retry transmissions.

An example of full-duplex communication in the network 42 of FIG. 2 involves point-to-point transmission between stations A and B via the hub 46. The hub 46 acts as a switch, enabling stations A and B to each simultaneously transmit and receive data. Alternatively, full duplex operation is also possible in the special case of two stations with no hub.

According to the current IEEE 802.3x Revision 1.0 Full-Duplex Draft, network stations 44 and the hub 46 are able to send a MAC control frame. Only one MAC control frame is currently specified by IEEE 802.3x[2], namely the PAUSE frame. The MAC control frame enables communications between the respective MAC controllers 22, for example, handshaking, signaling, etc. Hence, if station B detects an overload condition, the MAC 22 of the station B could output a PAUSE frame to the MAC 22 of station A, requesting the station A to pause for a specified number of slot times. A slot time ($t_s$) is defined as 512 bit times for 10 MBit/s and 100 MBit/s networks. The slot time ($t_s$) has a preferred value of 4096 bit times for 1000 MBits/s networks, although other values may be used consistent with network topology and propagation characteristics.

The disclosed network 42 minimizes the need for PAUSE frames by establishing a negotiated transmission rate, also referred to as a desired transmission rate, between each network station 44 and the hub 46. The hub 46 determines a desired transmission rate ($r_i$) for each network station 44, and transmits the desired transmission rate to the corresponding station as a MAC control frame in accordance with IEEE 802.3x[2] protocol. As described below, the desired transmission rate may be supplied to the corresponding network station 44 during powerup, during auto-negotiation, when a new network station 44 is added on the network 42, or when the hub 46 determines that the desired transmission rates should be reallocated for network stations 44 requiring more bandwidth.

One mechanism for implementing IPG delay to achieve a desired transmission rate is disclosed in U.S. patent application Ser. No. 08/706,317, entitled "A Method to Regulate the Rate of Packet Flow From a DTE to a DTE In Full or Half Duplex Mode", filed on Aug. 30, 1996, by Jayant Kadambi and Mohan Kalkunte, and is incorporated herein by reference.

Figure 3A:
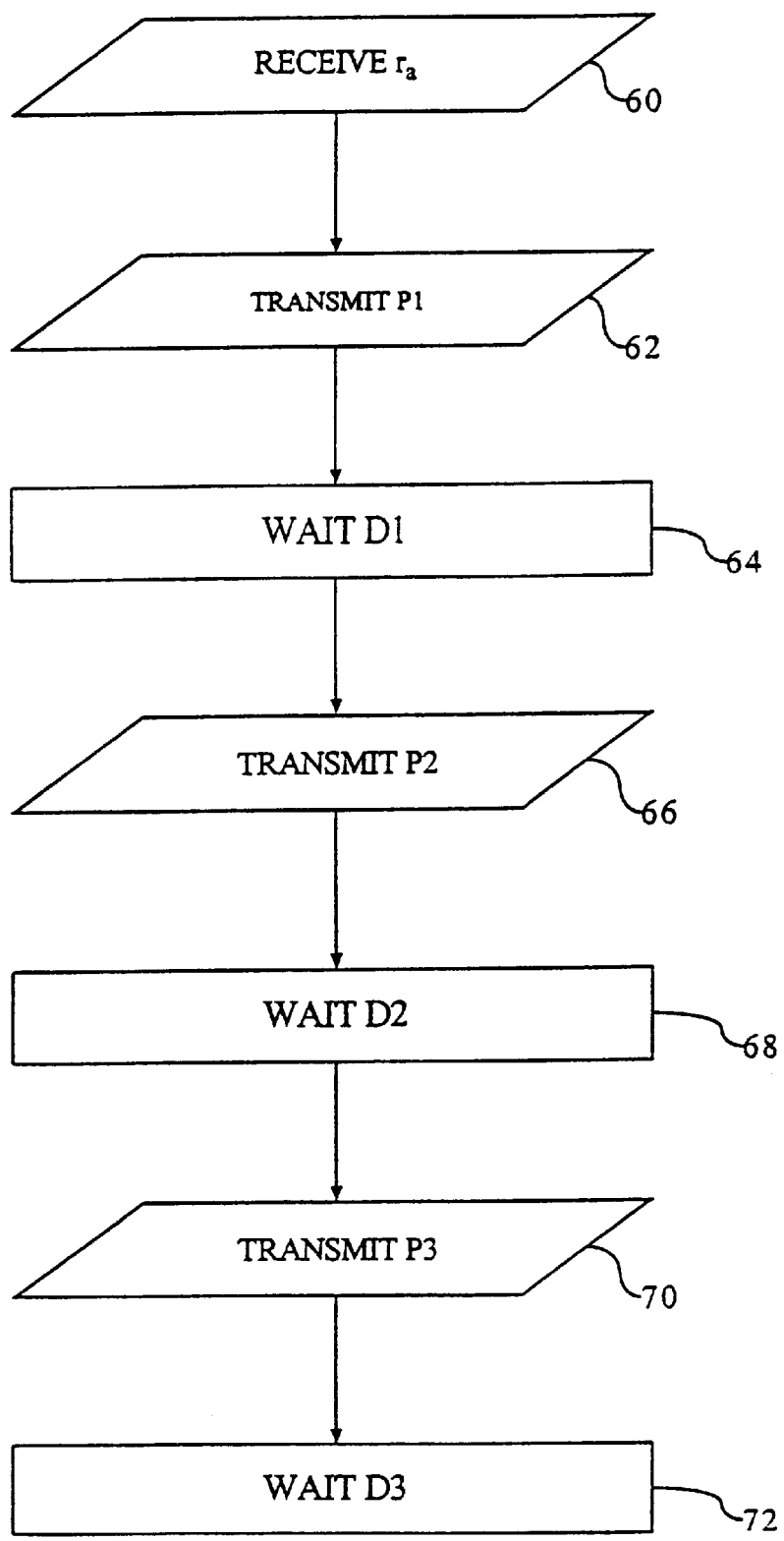
FIG. 3A is a flow diagram illustrating a method in a network station of transmitting data packets according to an embodiment of the present invention.

FIG. 3A is a flow diagram summarizing a method in a network station 44 of transmitting data packets according to an embodiment of the present invention. In general, each network station 44 controls its transmission of data packets by implementing an interpacket gap (IPG) delay on a packet-by-packet basis to ensure that its effective data packet transmission rate is in accordance with the desired transmission rate negotiated with the hub 46. For simplicity, the method of FIG. 3A is described with respect to station A.

The method begins in step 60 by station A receiving the desired transmission rate ($r_a$) from the network manager, illustrated in FIG. 2 as the hub 46. Hence, the network stations A, B, C, D, E 44, each receive their respective desired transmission rates $r_a$, $r_b$, $r_c$, $r_d$, $r_e$. The desired transmission rate ($r_a$) is preferably in the form of a time to transmit a bit or byte of data (sec/byte).

Station A then transmits a first data packet (P1) onto the network in step 62 according to full-duplex Ethernet protocol. Station A then determines a first delay time (D1) based upon the desired transmission rate ($r_a$) and the size of the first data packet (P1), described below, and in step 64 waits the determined first delay time (D1) before transmitting a second data packet (P2) step 66. As described below, the duration of the delay time is directly proportional to the size of the transmitted data packet. Hence, if the transmitted data packet (P1) has a large size, i.e., a large number of bytes, the delay time (D1) has a longer duration to maintain an overall constant output transmission rate.

After transmitting the second packet (P2) in step 66, station A determines a second delay time (D2) based on the size of the second data packet (P2) and the desired transmission rate ($r_a$), and then waits the second delay time (D2) in step 68. After transmitting the third data packet (D3) in step 70, station A determines a third delay time (D3) based upon the size of the third data packet (P3) and the desired transmission rate ($r_a$) and then waits the third delay time (D3) in step 72. Hence, the delay between data packet transmissions is determined on a per-packet basis to ensure that the effective transmission rate corresponds to the desired transmission rate.

Figure 3B:
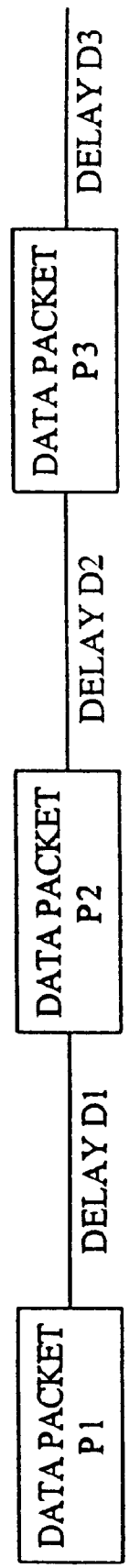
FIG. 3B is a block diagram illustrating the transmission of data packets from a network station according to the method of FIG. 3A.

FIG. 3B is a block diagram illustrating the transmission of data packets from station A according to the aforementioned methods illustrated in FIG. 3A.

Figure 4A:
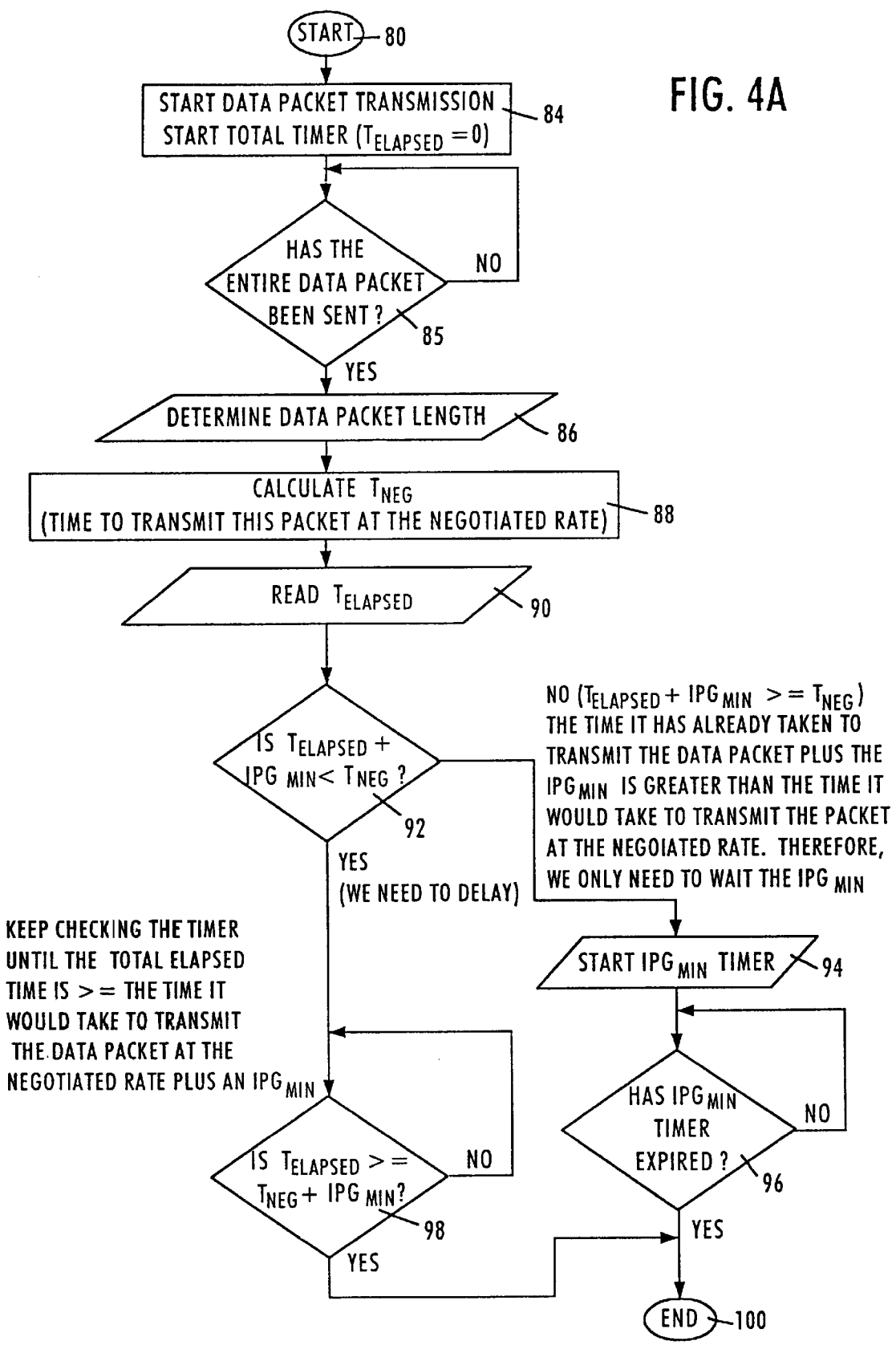
FIGS. 4A and 4B are detailed flow diagrams illustrating the method of transmitting data packets of FIG. 3A.

FIG. 4A is a flow diagram illustrating the steps performed by a network station 44 to transmit a data packet, determine a delay time and then wait the determined delay time, according to steps 62 and 64, steps 66 and 68 and steps 70 and 72 of FIG. 3A.

Figure 6:
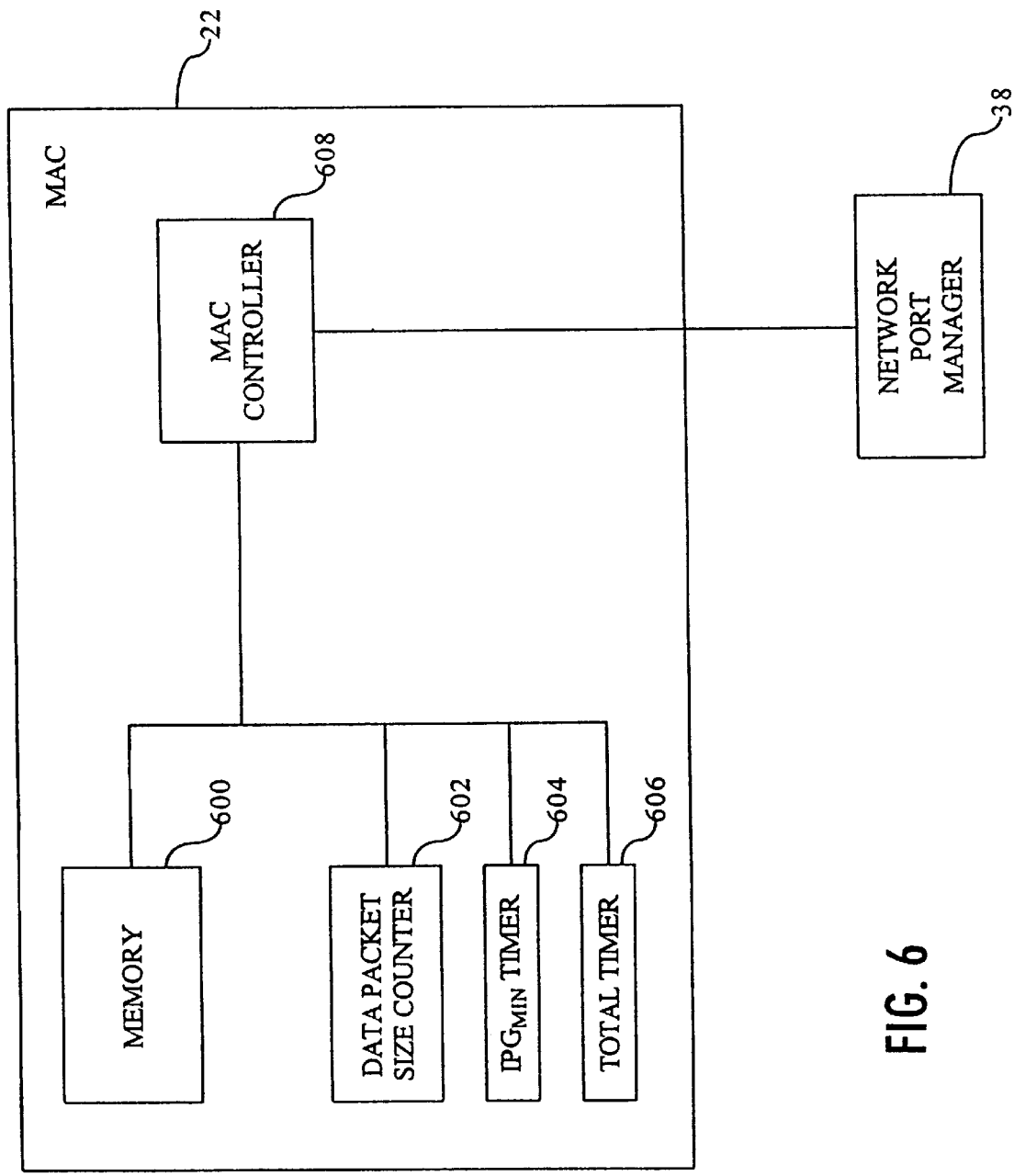
FIG. 6 is a block diagram of the media access controller (MAC) of FIG. 1.

These steps may be implemented by embedded executable code within a memory element in the MAC 22 (e.g., register, EPROM, EEPROM, Flash Memory), by discrete components, or any combination of embedded code and discrete components. The steps illustrated in FIG. 4A are described with respect to FIG. 1 and the various components of the MAC 22, illustrated in the MAC 22 block diagram of FIG. 6. The MAC 22 includes a memory 600, a data packet size (p) counter 602 for determining a size of a transmitted data packet, an $\text{IPGM}_{MIN}$ delay counter 604 and a total time counter 606. The MAC 22 also includes a MAC controller 608 for calculating the delay time (D) and for storing the network configuration data r, R, and IPG received from the network port manager 38.

Before transmitting a data packet, it is assumed that the MAC 22 has already received MAC control frames from the hub 46 identifying the desired transmission rate (r) and the predetermined network transmission rate (R) and stored the rates (r, R) in memory 600. As described above, the transmission rates r, R may be received by the network interface 10 during auto-negotiation with the hub 46.

Before starting in step 80, the MAC 22 determines whether the transmit FIFO buffer 32b has a data packet to send. If the MAC transmit FIFO buffer 32b has no data to send, the MAC 22 remains in a wait state until data is available. While waiting for a data packet to transmit, the MAC 22 may also be simultaneously receiving data in full-duplex mode. Once the MAC transmit FIFO buffer 32b has data for transmission, the MAC 22 starts in step 80 and transmits the data packet and simultaneously starts the total time counter 606 in step 84.

Figure 7:
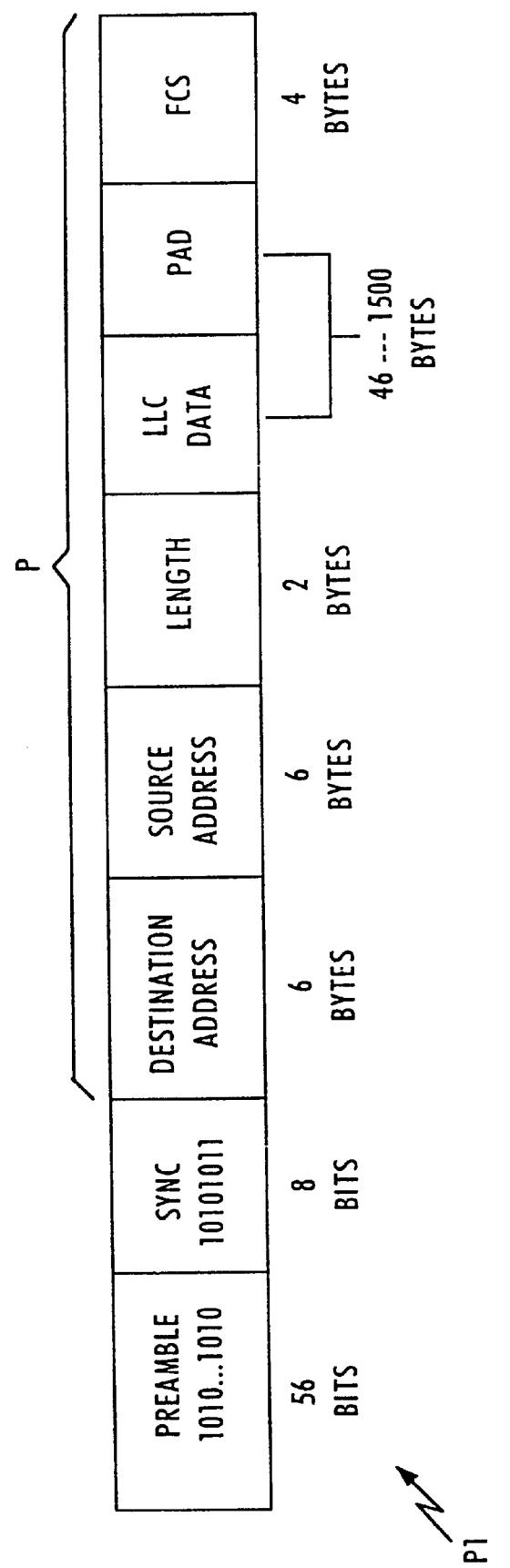
FIG. 7 is a block diagram of a data packet transmitted by the network interface of FIG. 1.

The contents of a data packet in accordance with ISO 8802-3 (IEEE/ANSI 802.3) are illustrated in FIG. 7. As indicated, the data packet size (p) is determined by number of bytes in the transmitted packet (P1), exclusive of the preamble and the Start Frame Delimiter (SFD) of the data packet transmitted onto the media 50. Information regarding the size of the data packet (p) is obtained from the internal MAC 22 counter 602 that counts the number of transmitted bytes. Alternatively, the length can be determined based on the length field (Length) of the transmitted data frame.

After the data packet is transmitted and the total timer started in step 84, the size of the data packet (p) is determined in step 86. After determining the data packet length in step 86, preferably in bytes, the time to transmit the data packet at the negotiated rate is easily calculated in step 88 according to the following equation:

$$T_{NEG} = p * r$$

where,
p is the data packet length, and
r is the desired transmission rate in sec/byte.

The calculated time to transmit the data packet at the negotiated rate ($T_{NEG}$) is directly proportional to the length of the data packet.

In step 90, the current elapsed time ($T_{ELAPSED}$), representing the actual time to transmit the data packet at the network 42 transmission rate R, is read from the total time counter 606. Then, in step 92, a comparison is made between $T_{NEG}$ and the sum of $T_{ELAPSED}$ and the minimum IPG delay ($IPG_{MIN}$). The minimum IPG delay ($IPG_{MIN}$) conforms to standard Ethernet protocol and is 9.6 microseconds for a 10 Mbit/sec network 42 and 0.96 microseconds for a 100 Mbit/sec network 42. Similar $IPG_{MIN}$s may be determined for other network 42 transmission rates R.

If, in step 92, it is determined that $T_{ELAPSED}$ plus $IPG_{MIN}$ is greater than or equal to $T_{NEG}$, then the time it has already taken to transmit the data packet plus the minimum interpacket delay of $IPG_{MIN}$ is greater than or equal to the time it would take to transmit the data packet at the negotiated rate (r). Therefore, the minimum interpacket delay satisfies the requirements of Ethernet protocol. Accordingly, in step 94, the $IPG_{MIN}$ timer 604 is started. Then, in step 96, a determination is made as to whether the $IPG_{MIN}$ timer has expired. If, in step 96, it is determined that the $IPG_{MIN}$ timer has not expired then step 96 is repeated until the $IPG_{MIN}$ timer expires. Once the $IPG_{MIN}$ timer 604 has expired, the process of transmitting a delayed packet determining and waiting for an interpacket delay is complete in step 100.

Referring back to step 92, if $T_{ELAPSED}$ plus $IPG_{MIN}$ is less than $T_{NEG}$ then an additional delay must occur before the next data packet can be transmitted to ensure that the transmission of data packets conforms to the negotiated rate (r). Accordingly, in step 98, the total timer 606 is continuously examined until the total elapsed time ($T_{ELAPSED}$) is greater than or equal to the time it would take to transmit the data packet at the negotiated rate (r) plus the minimum interpacket delay ($IPG_{MIN}$). The additional delay is provided by the total timer 606, eliminating the need for a separate timer. Once the total elapsed time ($T_{ELAPSED}$) is greater than or equal to the time it would take to transmit the data packet at the negotiated rate (r) plus ($T_{NEG}$) plus the minimum interpacket delay ($IPG_{MIN}$), the process of transmitting a data packet followed by a delay necessary to maintain the negotiated rate (r) has been achieved and the process completed in step 100.

According to another aspect of the present invention, a method is provided for transmitting data packets at approximately a negotiated rate. The method involves calculating a transmission window ($T_{WIN}$) based upon the time to transmit a data packet having an assumed size at the negotiated rate. According to an Ethernet implementation, the assumed packet size is the maximum data packet size of 1518 bytes. Since the negotiated rate is less than the network transmission rate, the actual time to transmit the data packet will be less than the calculated time to transmit the data packet at the negotiated rate. In addition, the actual length of the data packet may be less than the presumed data packet length, which can result in the actual transmission time being significantly less than the calculated transmission time.

Accordingly, additional data packets are transmitted within the transmission window($T_{WIN}$) until the transmission window($T_{WIN}$) has been filled. To prevent the violation of the transmission window($T_{WIN}$), a byte threshold is used to determine whether another data packet can be transmitted without violating the transmission window($T_{WIN}$).

Figure 4B:
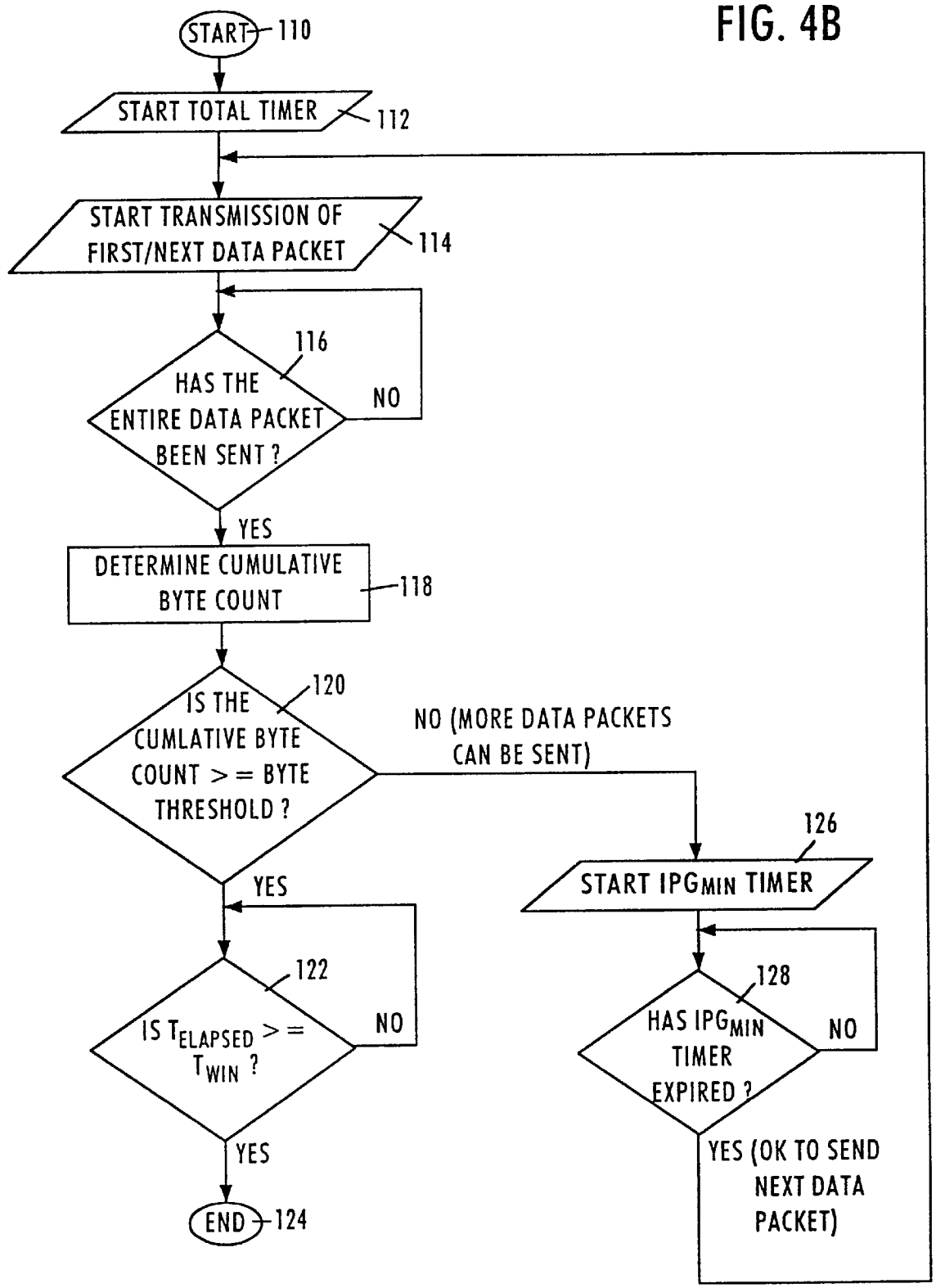

FIG. 4B illustrates the particular steps for performing this method and are described as follows. Before the method is started, the negotiated rate and an assumed data packet size are known. As before, the negotiated rate (r) is provided in the form of a time to transmit a bit or byte at the negotiated rate (r), such as (sec/byte). Based upon the assumed data packet size and the negotiated rate, the transmission window ($T_{WIN}$) is calculated. The transmission window($T_{WIN}$) time is the product of the assumed data packet length and the negotiated rate. Alternatively, a look-up table may be provided in memory 600 (FIG. 6) of the MAC 22 which contains the transmission window($T_{WIN}$) for various combinations of assumed data packet sizes and negotiated rates.

After starting in step 110, a total timer is started in step 112. Then in step 114, the first data packet is transmitted onto the network. In step 116, determination is made as to whether the entire data packet has been sent. If the entire data packet has not been sent, then step 116 is repeated until the entire data packet has been sent. Once the entire data packet has been sent, the cumulative byte count is determined in step 118. The cumulative byte count represents the total number of bytes for all of the data packets transmitted within the current transmission window($T_{WIN}$).

In step 120, a determination is made as to whether the cumulative byte count is greater than or equal to a byte threshold. If the byte count is greater than or equal to the byte threshold, then no more data packets can be sent within the current transmission window($T_{WIN}$) and the total remaining time in the transmission window($T_{WIN}$) is allowed to expire without the transmission of additional data packets. The byte threshold is determined based upon the network transmission rate and the average data packet size to ensure that the aggregate time to transmit the data packets does not exceed the transmission window ($T_{WIN}$).

To determine whether the transmission window ($T_{WIN}$) has closed, in step 122 a determination is made as to whether the total elapsed time ($T_{ELAPSED}$), as indicated by the total timer, is greater than or equal to the transmission window ($T_{WIN}$). If the transmission window($T_{WIN}$) has not yet expired, then step 122 is repeated until it does expire and the process completed in step 124.

If, on the other hand, in step 120, the cumulative byte count is less than the byte threshold, then additional data packets can be sent within the current transmission window ($T_{WIN}$). However, to conform to Ethernet protocol, a minimum interpacket gap ($IPG_{MIN}$) is provided between data packets. Accordingly, in step 126, the $IPG_{MIN}$ timer is started. Then, in step 128, a determination is made as to whether the $IPG_{MIN}$ timer has expired. If the $IPG_{MIN}$ timer has not expired, then step 128 is repeated until it does. After the expiration of the $IPG_{MIN}$ timer in step 128, the next data packet is transmitted in step 114.

As illustrated in FIG. 4B, this method sets a transmission window($T_{WIN}$) based upon a time to transmit a data packet of a fixed, assumed size at the negotiated rate and then sends as many data packets as possible within the transmission window($T_{WIN}$). The threshold is used to minimize the likelihood that the time to transmit the last data packet within the window will exceed the transmission window.

This approach has the benefit of a very simple implementation without requiring the calculation of an interpacket delay (IPG). The variation of actual data packet size from the presumed data packet size can result in unused time in the transmission window($T_{WIN}$), in which case the effective transmission rate will be less than the negotiated rate. On the other hand, if the actual data packet size exceeds the assumed data packet size, then the actual time to transmit the data packets may exceed the transmission window($T_{WIN}$), resulting in an effective transmission rate which is higher than the negotiated rate. This condition can only occur if the assumed data packet size is less than the maximum data packet size supported by the particular communications protocol. Essentially, this approach sacrifices the accuracy of the transmission of data packets at the negotiated rate for simplicity of implementation.

Figure 5:
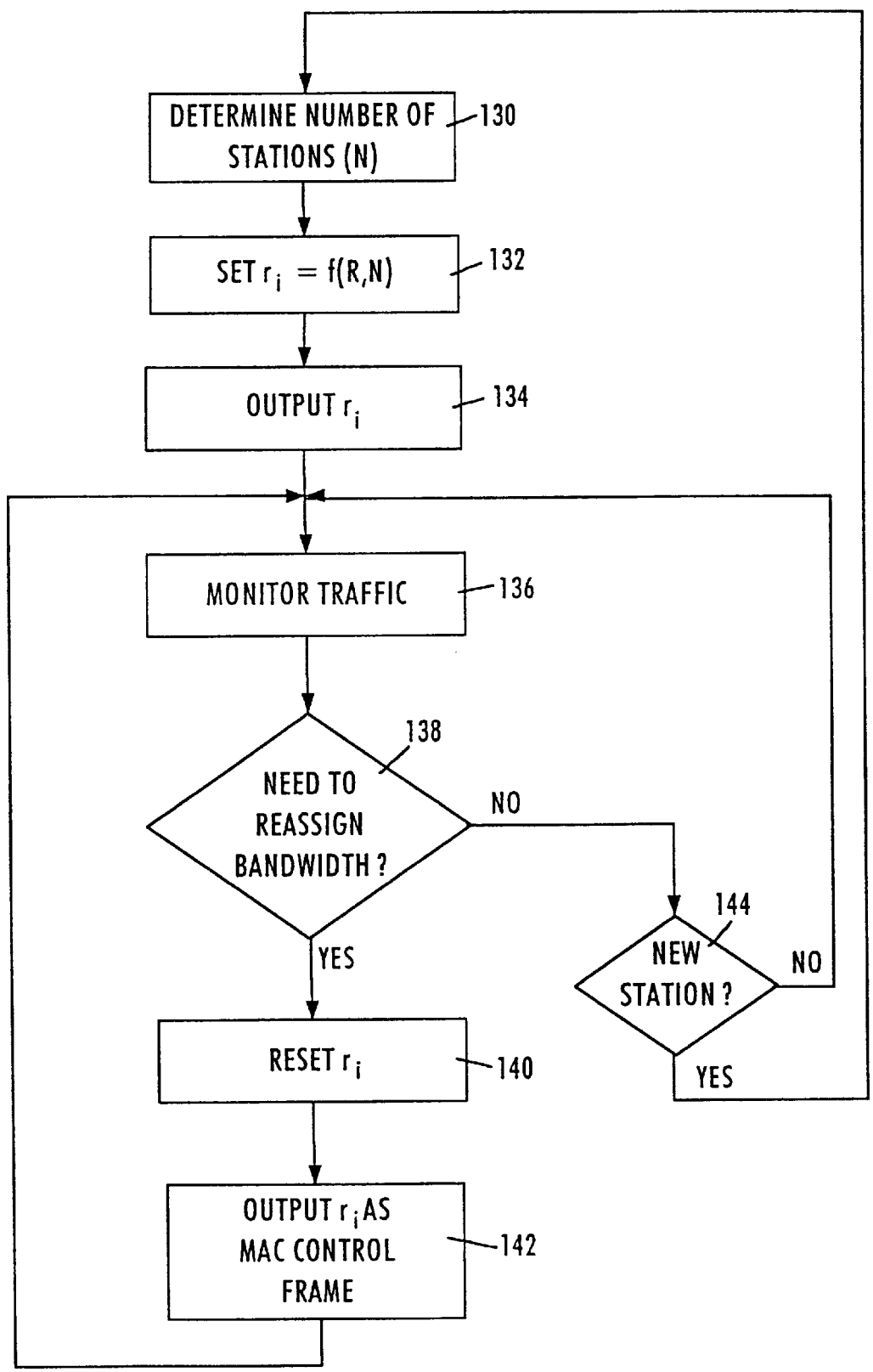
FIG. 5 is a flow diagram illustrating a method of controlling transmission of data packets by network stations according to an embodiment of the present invention.

FIG. 5 is a flow diagram illustrating a method of controlling transmission of data packets according to an embodiment of the present invention. The method of FIG. 5 is implemented in the hub 46, where the auto-negotiation unit 46a monitors the traffic of the network stations 44, and resets the desired network transmission rates if necessary, for example if a new station becomes active on the network.

As illustrated in FIG. 5, the hub 46 begins by determining in step 130 the number of stations (N) on the network. After determining the number of stations, the hub 46 then sets in step 132 each of the desired transmission rates ($r_i$) as a function of the network transmission rate (R) and the number of stations ($r_i$=f(R,N)).

After setting the desired transmission rate in step 132, the hub 46 outputs in step 134 a MAC control frame identifying the desired transmission rate ($r_i$) to each network station 44, and begins monitoring traffic in step 136. For example, the hub 46 may maintain statistical data to measure the level of activity by each of the network stations to determine which stations are the most active, or which stations send the largest data packets. The hub 46 then determines in step 138 whether bandwidth needs to be reassigned by changing the desired transmission rates of the stations. If the hub 46 determines that bandwidth does not need to be reassigned, then the hub 46 checks in step 144 if a new station is added to the network. If no new station is added, the hub 46 continues to monitor traffic in step 136. However, if a new station is added in step 144, the hub 46 recalculates the desired transmission rate based upon the new number of stations.

If in step 138 the hub 46 determines that bandwidth needs to be reassigned based upon the detected transmission of data packets from the network stations, the hub 46 resets the desired transmission rates ($r_i$) in step 140. For example, assuming the network transmission rate is R=100 Mbit/s, and stations A, B, C, and D are transmitting data to station E operating as a gateway device, the desired transmission rate set in step 132 would be 24 Mbit/s for stations A, B, C, D to transmit to station E of FIG. 2, and 4 Mbit/s for station E to send acknowledgment packets. Assuming that the hub 46 determined in step 136 that station A no longer transmits packets, the hub 46 could reset the desired transmission rates to $r_a$=5 Mbit/s, $r_b$=30 Mbit/s, $r_c$=30 Mbit/s, $r_d$=30 Mbit/s, and $r_e$=5 Mbit/s. Hence, the hub 46 may dynamically reassign the bandwidth, as needed.

After reassigning the desired transmission rate for each of the stations in step 140, the hub 46 outputs the new desired transmission rates as MAC control frames in step 142 to the respective stations, and returns to monitoring network activity.

According to the present invention, a delay time is calculated based on a packet size to maintain a desired transmission rate. Setting the desired transmission rate to correspond to a maximum reception rate at a receiving station enables full-duplex operations without the necessity of PAUSE frames. Hence, the throughput of the full-duplex network can be maximized without the occurrence of congestion.

Although the disclosed embodiment is described with respect to a plurality of stations connected to a switched hub, the present invention is applicable to a network consisting of two stations communicating in full-duplex mode.

In addition, any of the network stations may be reset to use the minimum IPG by resetting the desired transmission rate to correspond substantially to the network transmission rate.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method in a network node for transmitting data packets on a network, the method comprising the steps of:
   a) transmitting a first data packet at a first rate onto the network according to a prescribed full duplex network protocol;
   b) determining a delay time based upon:
      i) an elapsed time to transmit the first data packet at the first rate, and
      ii) a calculated time to transmit the first data packet at a desired transmission rate specified by a network manager; and
   c) upon expiration of the determined delay time following the first data packet transmission, transmitting a second data packet onto the network.

2. The method of claim 1, further comprising the steps of
   a) determining the size of the first data packet, and
   b) determining the calculated time based upon the size of the first data packet and the disred transmission rate.

3. The method of claim 1, wherein the step of determining the delay time further comprises the steps of,
   a) determining the size of the first data packet,
   b) measuring the elapsed time, and
   c) determining the calculated time based upon the determined size of the first data packet and the predetermined rate.

4. The method of claim 1, wherein the step of determining the delay time further comprises the step of comparing the calculated time to a sum of the elapsed time and a minimum delay time.

5. A method for transmitting data packets on a network, the method comprising the steps of:
   a) transmitting a first data packet at a first rate on the network;
   b) measuring the time to transmit the first data packet at the first rate;
   c) after the first data packet has been transmitted, computing a time to transmit the first data packet on the network at a desired transmission rate specified by a network manager; and
   d) waiting the determined delay time before transmitting a second data packet on the network.

6. The method of claim 5, further comprising the steps of
   a) determining the size of the first data packet, and
   b) determining the computed time based upon the size of the first data packet and the predetermined rate.

7. A method for transmitting data packets on a network according to a predetermined rate, the method comprising the steps of:
   a) transmitting a first data packet at a first rate on the network;
   b) measuring the time to transmit the first data packet at the first rate;
   c) after the first data packet has been transmitted, computing a time to transmit the first data packet on the network at the predetermined rate;
   d) waiting the determined delay time before transmitting a second data packet on the network,
   e) determining the size of the first data packet; and
   f) determining the computed time based upon the size of the first data packet and the predetermined rate, wherein the step of determining the delay time further comprises the steps of:
      a) comparing the computed time with the sum of the measured time and a minimum delay time,
      b) if the computed time is less than or equal to the sum of the measured time and the minimum delay time, determining the delay time to be an amount equal to the minimum delay time, and
      c) if the computed time is greater than the sum of the measured time and the minimum delay time, determining the delay time to be a sum of the computed time and the minimum delay time.

8. A method for transmitting data packets on a network at approximately a predetermined rate, the method comprising the steps of:
   a) transmitting a first data packet at a first rate onto the network;
   b) determining whether a data threshold has been exceeded;
   c) if the data threshold has been exceeded, determining a delay time based upon
      i) an elapsed time to transmit the first data packet at the first rate, and
      ii) a calculated time to transmit the first data packet at the predetermined rate;
   d) if the data threshold has not been exceeded, determining a delay time based upon a minimum delay; and
   e) upon expiration of the determined delay time, transmitting a second data packet onto the network.

9. The method of claim 8, wherein the step of determining whether the data threshold has been exceeded further comprises the steps of,
   a) determining the size of the first data packet, and
   b) comparing the determined size of the first data packet to an assumed size of the first data packet.

10. The method of claim 8, further comprising the step of determining the data threshold based upon
    a) an assumed size of the first data packet, and
    b) the data packet transmission rate of the network.

11. The method of claim 8, further comprising the steps of,
    a) determining a transmission window based upon a calculated time to transmit a data packet having an assumed size at the predetermined rate, and
    b) comparing the elapsed time to the transmission window.

12. A network interface comprising:
    a) a memory for storing a first data packet to be transmitted on a network; and
    b) a controller configured for receiving a desired transmission rate from a network manager and for transmitting the first data packet from the memory onto the network at a first network rate, the controller being configured to determine a waiting time specifying an idle interval between the transmission of the first data packet and transmission of a second data packet, the waiting time calculated based upon an elapsed time to transmit the first data packet at the first network rate and a calculated time to transmit the first data packet at the desired transmission rate.

13. The network interface of claim 12, further comprising
    a) means for determining the size of the first data packet, and
    b) means for determining the delay time based upon the elapsed time and the calculated time.

14. The network interface of claim 13, further comprising means for comparing the calculated time with the sum of the elapsed time and a minimum delay time to determine the delay time.

15. The network interface of claim 12, wherein the controller outputs the first data packet according to a prescribed full-duplex network protocol.

* * * * *